(12) United States Patent
Goodwin et al.

(10) Patent No.: US 8,509,973 B2
(45) Date of Patent: Aug. 13, 2013

(54) HIGH PERFORMANCE AND IMPROVED EFFICIENCY ELECTRIC VEHICLE AND METHODS OF PRODUCTION

(75) Inventors: Johnathan Goodwin, Wichita, KS (US); Uli Kruger, Aldgate (AU); Neil Young, Los Angeles, CA (US)

(73) Assignee: Neil Young, Los Angeles, CA (US)

( * ) Notice: Subject to any disclaimer, the term of this patent is extended or adjusted under 35 U.S.C. 154(b) by 704 days.

(21) Appl. No.: 12/638,752

(22) Filed: Dec. 15, 2009

(65) Prior Publication Data
US 2010/0211241 A1    Aug. 19, 2010

Related U.S. Application Data

(60) Provisional application No. 61/122,531, filed on Dec. 15, 2008.

(51) Int. Cl.
*H02P 25/24* (2006.01)
(52) U.S. Cl.
USPC ............................................. 701/22; 310/45
(58) Field of Classification Search
USPC ............... 701/22; 322/89, 90, 46, 44, 94; 310/45, 40 R, 68 R; 180/216, 220, 53.1, 180/53.5
See application file for complete search history.

(56) References Cited

U.S. PATENT DOCUMENTS

| | | | |
|---|---|---|---|
| 4,874,974 A | 10/1989 | Wu | |
| 6,259,233 B1* | 7/2001 | Caamano | 322/89 |
| 6,407,466 B2* | 6/2002 | Caamano | 290/52 |
| 7,193,385 B2* | 3/2007 | Emadi et al. | 318/568.18 |
| 7,872,440 B2* | 1/2011 | Atarashi et al. | 318/772 |
| 7,960,931 B2* | 6/2011 | Rodriguez et al. | 318/432 |
| 2002/0117991 A1 | 8/2002 | Burse | |

FOREIGN PATENT DOCUMENTS

EP      1981162 A2      10/2008

* cited by examiner

*Primary Examiner* — Dalena Tran
(74) *Attorney, Agent, or Firm* — Buchalter Nemer; Sandra P. Thompson

(57) ABSTRACT

Motor systems are disclosed that include: a motor component, at least one motor stator module, and at least one binary controller, wherein the binary controller is coupled to the at least one module. In some embodiments, a contemplated motor system also comprises at least one primary motor controller, wherein the primary motor controller is coupled to a vehicle speed component. Methods of using these motor systems and motorized vehicles comprising contemplated motor system are also disclosed.

19 Claims, 1 Drawing Sheet

HIGH PERFORMANCE AND IMPROVED EFFICIENCY ELECTRIC VEHICLE AND METHODS OF PRODUCTION

This United States Utility Application claims priority to U.S. Provisional Application Ser. No. 61/122,531 filed on Dec. 15, 2008, which is incorporated herein in its entirety by reference.

BACKGROUND

Electric and hybrid electric vehicles, both existing cars and concept cars, have gained popularity in recent years as a result of rising gasoline cost, longer commute times, traffic congestion and increased public awareness on the consequences of greenhouse gas (GHG) emissions and the use of foreign oil.

The reality of domestic crude oil drilling is that there is not enough equipment or refineries to process enough recovered crude oil to meet our immediate demands. Any crude recovered won't be ready for public consumption for at least eight years. Two other options that are being used to bridge the gap between foreign oil importation, domestic oil production and new technologies are ethanol and compressed natural gas. Both fuels solve the problem of America's dependence on foreign sources of oil. Neither fuel solves the problems of greenhouse gas emissions and complete renewable energy sources.

Ethanol is produced in the US from corn or switchgrass, as opposed to sugar ethanol produced in South America, and is utilized as both a fuel additive and straight fuel source. While ethanol fuel is cleaner than gasoline, the process to produce ethanol is rife with greenhouse gas-producing sources, including ethanol-generating facilities that burn coal to transform corn to ethanol.

Compressed natural gas (CNG) is a fossil fuel source and found in abundance in the US. While it is a cleaner combustion fuel, it still produces greenhouse gases. The innovation surrounding CNG will be directed primarily to four things: recovery of CNG, gas station retrofitting to accept CNG, since the tanks needed to store this fuel source are larger, retooling of transportation production lines to produce engines that can accept CNG, and scrubbing exhaust streams of greenhouse gases.

The "holy grail" in the area of automobile development is to give the consumer unlimited car options, while at the same time significantly improving fuel efficiency, moving to zero emission engines and traveling long distances without charging, if the car is electric. Car buyers do not want to be forced to purchase small cars with little/no storage space, power or hauling capacity.

Developers are also utilizing new sources of power generation, such as solar and turbines, to provide power to new engines. Obviously, both of these power sources are renewable and do not rely on complex processes for recovery, refinement and production. Key innovations in this particular technology will improve the efficiency and size of solar panels and components, along with similar advancements in turbine development. These innovations are already taking place with solar and wind turbine power generation on a large scale.

Once the power is generated and backup power is stored, the next step is giving the car enthusiast a reason to get excited about driving these new cars. Most of this excitement comes from the ability to move quickly with power over different terrains without loss of performance.

Technology has come far enough along to make the concept of an "ideal vehicle" a reality for the typical consumer. The ideal vehicle is powered by an unlimited renewable source, such as wind, waves or sun. In the case of wind and waves—each of these sources can be utilized to produce the electricity used to charge up a battery in a vehicle. An ideal vehicle is whatever type of vehicle that car buyer wants to purchase, as mentioned earlier. If the consumer wants to purchase a large SUV, such as a Suburban or Hummer, the car should be electric, powerful and have a long-range of travel between charges. These cars should also be zero emission vehicles that are capable of powering a home or other facility, if necessary, as opposed to being a one-way consumer of power and electricity.

As researchers continue to develop new and improved engines, there are several areas that are focused on: performance, efficiency and ease of use. Performance can be measured by how a vehicle—whether it's a car, motorcycle or boat—responds under a "request" by the driver for more power. Whether a driver wants to accelerate quickly or tackle an incline at consistent speeds, performance is an important consideration when building and/or improving engines. Efficiency is related to performance, but is measured in how well the motor responds at various power output levels. Finally, the ease of use relates to whether the engine and related devices are easy to manufacture, easy to install and easy to maintain by a consumer. All of these component characteristics should be considered and balanced when designing, developing and building new engine technologies.

Electric vehicles, such as the Tesla Roadster from Tesla Motors, have certain advantages. They are considered "zero emission" vehicles because they produce no greenhouse gas. However, there are certain limitations associated with conventional electric vehicles. Most significantly, the range of an electric vehicle is limited by its battery capacity and the battery's long recharge time. A typical electric vehicle using a lead-acid battery has a range of less than 100 miles before a recharge is required. Advanced batteries such as nickel metal hydride (NiMH) and lithium-ion batteries have higher capacities, but are still incapable of being used for long-distance travel. Another drawback of an electric vehicle is its power source. While electric vehicles do not generate greenhouse gases, they rely on energy generated at power plants. Many of these power plants emit green-house gases, and much of the power generated at the power plants is wasted during the transmission from the power plants to the consumers.

The use of hybrid electric powertrains—a combination of an electric motor and an internal combustion engine—addresses the range limitation of electric vehicles; however, it doesn't address the issue of fuel consumption and greenhouse gas emissions. Conventional hybrid electric vehicles typically have a small gasoline engine and an electric motor. The electric motor, the gasoline engine, or a combination of both can be used to power the vehicle. Thus, when the battery is low on energy, the vehicle can still operate using the gasoline engine alone. Typically, traditional hybrid electric vehicles use regenerative braking to charge their batteries.

There are several drawbacks to conventional hybrid electric vehicles. First, a traditional hybrid electric vehicle has both a complete internal-combustion engine system (including an engine and a transmission) and an electric motor system (including a generator, a battery, and electric motors). Therefore, the weight of the vehicle is greatly increased as compared to an electric vehicle or a gasoline vehicle with a similar-sized gasoline engine. In addition, the manufacturing cost of the vehicle is increased due to the need to have both an internal combustion engine system and an electric motor system. Finally, conventional regenerative braking in a hybrid electric system is inefficient because a significant portion of the energy produced by the gasoline engine is wasted and irrecoverable.

A problem common to both electric vehicles and conventional hybrid electric vehicles is the weight and cost of the batteries. Both types of vehicles must carry a large and heavy battery pack. Furthermore, with each successive charge and recharge cycle, the capacity of the battery pack degrades. Typically, the battery pack of an electric or traditional hybrid electric vehicle must be replaced after a certain period of use, such as 100,000 miles.

Therefore, it would be ideal to create an electric vehicle that has features solving many, if not all, of the problems stated above: longer range, lighter weight, highly efficient power generation, little or no fossil fuels, normal size or smaller motor system and a smaller battery pack. This application is related to U.S. Provisional Application Ser. No. 61/028,353 filed on Feb. 13, 2008, which is incorporated herein by reference. However, contemplated vehicles disclosed herein are electric vehicles, as opposed to the hybrid electric vehicles disclosed therein.

SUMMARY OF THE SUBJECT MATTER

Motor systems are disclosed that include: a motor component, at least one motor stator module, and at least one binary controller, wherein the binary controller is coupled to the at least one module. In some embodiments, a contemplated motor system also comprises at least one primary motor controller, wherein the primary motor controller is coupled to a vehicle speed component. Methods of using these motor systems and motorized vehicles comprising contemplated motor system are also disclosed.

DETAILED DESCRIPTION

Figure 1:
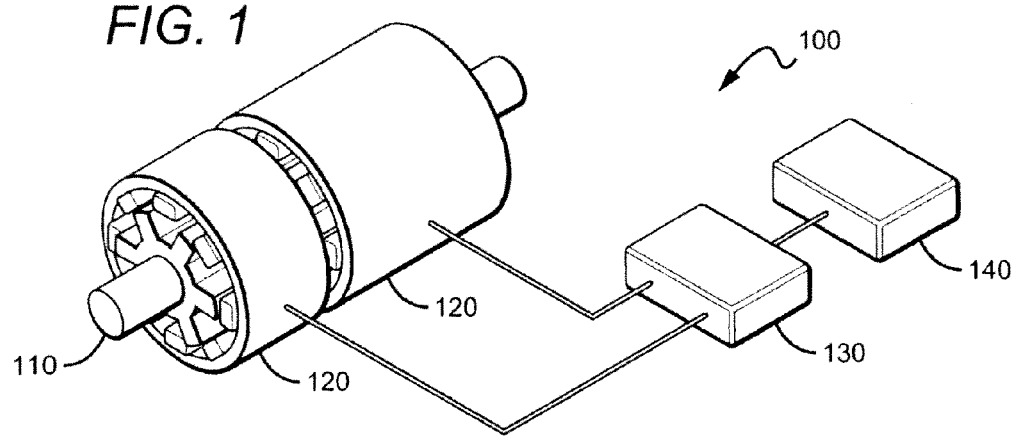
FIG. 1 shows a motor system 100 comprising a two stage system having a common rotor 110, two binary scaled stator modules 120, wherein the stator modules are coupled to a binary controller 130 and then to a primary motor controller 140.

A solution to these issues, as disclosed in detail herein, includes a self-powering electric vehicle with the following features: longer range, lighter weight, highly efficient power generation, minimal or zero emissions, a smaller battery pack, normal size or smaller size motor system and increased battery life.

It is first important to choose the correct size of electric motor system for an electric vehicle. The size of an electric motor system affects not only the performance characteristics but also the electric conversion efficiency at low power demands. A high power electric motor will provide excellent acceleration and superior performance, but it will also provide low efficiency under low to moderate loads. This efficiency compromise is based on the specific efficiency curve of a typical electric motor. For example, efficiencies of 80% and above are typically only achievable at load factors above 30%.

In order to achieve load factors at or above 30% under cruise conditions, the motor must be of a moderate to low power output size, which unfortunately, will limit the overall performance of the vehicle. To address this problem, one can install more than one smaller motor, where only one motor is used for cruising, and two or more are used to achieve acceleration and performance when needed. This design, however, comes at the expense of cost, complexity and increased vehicle weight.

Specifically, contemplated motor systems address the load factor, performance, cost, complexity and vehicle weight issues and include: at least one motor component, at least one motor stator module, at least one binary controller, wherein the binary controller is coupled to the at least one stator module. In some embodiments, there is at least one primary motor controller, wherein the primary motor controller is coupled to a vehicle speed component. Methods of using these motor systems and motorized vehicles comprising contemplated motor system are also disclosed.

Contemplated embodiments may comprise any suitable motor system or combination of motor systems that achieve the desired increase in performance and efficiency, as described herein. In contemplated embodiments, at least one motor system, which in contemplated embodiments is electric, is utilized to operate the vehicle. There are also many suitable smaller electric motors that will work very well with this new design.

In a contemplated embodiment, a contemplated motor component comprises a rotor and the at least one motor stator module comprises at least two load bearing module components. In some embodiments, the at least two load bearing module components comprise either different values or the same load values. As will be discussed, in some embodiments, the at least one binary controller comprises at least one programmable chip component, wherein the chip component comprises a binary coding system.

In another embodiment, a contemplated motor component comprises an electric engine, wherein there may be one or more electric engines utilized as the at least one motor component. This type of embodiment is useful when an electric motor or motors are being utilized that is not a binary scaled switch reluctance motor. In these embodiments, the binary controller will control the or each engine in the motor system.

One contemplated motor comprises a switched reluctance type electric motor, which is detailed in the Examples section, as part of the overall design. This type of motor does not have permanent magnets as part of its construction, and therefore, it has no cogging losses when passively turned. In this type of embodiment, the module that is not used at the time does not pose any drag on the rest of the system. DC motors do not idle freely with no drag. The cogging comes from the permanent magnets, and so in that regard, AC motors are better. The motor has a single rotor on a common shaft, but more than one stator module with coil windings. Each one of the stator modules are electrically connected independently in relation to each other, but are coupled with and controlled together by at least one binary controller. The theory and operation behind these motors can be seen at http://www.fleadh.co.uk/srm.htm and http://www.allaboutcircuits.com/vol_2/chpt_13/4.html, which are incorporated herein by reference in their entirety. In other embodiments, the controller and scaling system work equally well in generator mode (Binary scaled generator).

In a contemplated embodiment, the at least one motor system may be designed to split the load into two motors or stator modules of the same size—for example, 2×30 kw, and one would end up with two pre-selected power output levels, power ranges, resolution or a combination thereof, such as 30 kw and 60 kw. In another embodiment, one can split the at least one motor system into two different size motors or stator modules having two different sized—20 kw and 40 kw—with the benefit that one gets at least three pre-selected power output levels, power ranges, resolution or a combination thereof—in this case 20 kW, 40 kW and 60 kW. These split motor system designs are based on a binary coding system where the binary coding results in creating the pre-selected power output levels, power ranges, resolution or a combination thereof. A multi-bit or two-bit binary code or coding results in a three step resolution. A three-bit binary coding (10 kW, 20 kW, 40 kW) leads to a seven step resolution: 10 kW, 20 kW, 30 kW, 40 kW, 50 kW, 60 kW, 70 kW. The control for this system is directly binary and all programmable chips are set up to put out binary coding commands. The binary code for the 2-bit motor is 1, 01, 11 and for the 3-bit motor 1, 01, 11, 001, 101, 011, 111. The controller would have several discreet driver modules as well. One matching each stator module, which would not result in a huge increase in cost since everything is located in the same housing. There is still only one binary control module which is split internally.

In addition, there is at least one primary motor controller, wherein the primary controller is coupled to at least one vehicle speed component. In contemplated embodiments, a vehicle speed component comprises a throttle component or another power component.

FIG. 1 shows a motor system 100 comprising a two stage system having a common rotor 110, two binary scaled stator modules 120, wherein the stator modules are coupled to a binary controller 130 and then to a primary motor controller 140. Typically, this embodiment would be suitable for a small to medium car with a 20 Kw and a 40 Kw module giving 3 binary steps of 20 Kw each. The binary controller module is the one with the binary control algorithm which designates which module comes in at which load. Table 1 shows a contemplated example of a load distribution for a 3 module 105 Kw motor along with an appropriate binary code. The load distribution between modules is shown in binary coding (7 steps).

TABLE 1

| Kw | Module 1 | Module 2 | Module 3 |
|---|---|---|---|
| 1 to 15 | 1 | 0 | 0 |
| 15 to 30 | 0 | 1 | 0 |
| 30 to 45 | 1 | 1 | 0 |
| 45 to 60 | 0 | 0 | 1 |
| 60 to 75 | 1 | 0 | 1 |
| 75 to 90 | 0 | 1 | 1 |
| 90 to 105 | 1 | 1 | 1 |

A contemplated primary motor controller operates at least one of the modules simultaneously, depending of the given load factor of the vehicle, which ensures that the load factor will always be matched with the optimum efficiency band of the motor. Under cruise conditions, only one stator is employed whereas at full acceleration, all stator modules operate simultaneously.

Contemplated primary motor controllers are also active in controlling other components in the vehicle in order to maximize performance and efficiency without utilizing outside sources of electric current and/or battery power. These controllers are also responsible for controlling and regulating electrical current generation modules, secondary or supplemental battery power packs and additional motors.

Contemplated vehicles may comprise any suitable vehicle, such as a car, boat, motorcycle, jet ski, truck or another vehicle. The vehicle may further comprise an electric motor system, a battery pack, a generator and a modified gear box. Some contemplated embodiments may also comprise a motor controller or controller that regulates the various components of the vehicle. The vehicle may also comprise other components commonly found in an electric vehicle.

The generator or combination of generators is one of the key building blocks to this new electric system for powering vehicles, and in this system, the generator or combination of generators may comprise any suitable efficient component or system. Contemplated generators may comprise various turbines, such as Tesla turbines, rotary devices, tuned single rpm version of a rotary device, Peripeteia generators, such as that found in WO 2008/067649 or a combination thereof.

The modified gear box, the second primary component of novel electric systems, converts and regulates power directly from the source generator to the electric motor, which solves many of the issues with power and propulsion in electric vehicles. One important consideration is that the engine, the alternator and the electric drive motor operate within their optimum power bands at all times, which will result in optimal overall system efficiency. The key to this is the modified gear box, which may be or comprise an infinitely variable gearbox, with minimal internal transmission losses. One contemplated gear box comprises a epicyclic roller arrangement with a control mechanism that feeds the speed control force back into the output shaft with no losses. Contemplated embodiments may comprise more than one modified gear box—such as one between the engine and the alternator and one between the drive motor(s) and the wheels. These multiple gear boxes will allow for the maximization of the efficiency band of all components in the desired optimal range.

Contemplated electric vehicles may also utilize the same principles as a wind turbine system, such as those seen in wind farms located throughout the world. The battery or battery pack located in contemplated electric vehicles is utilized primarily (and sparingly in most normal driving conditions) as a backup source of power that is recharged through regenerative braking.

In addition, this contemplated overall design solves the inherent problem related to the reliance on batteries as the primary source of power. Batteries are not renewable, do not stay charged for longer than 200-300 miles of normal use, and are not environmentally-friendly. Specifically, the electric gearbox is an electro-mechanical device which uses a rotational-mechanical aspect to deliver an infinite amount of gears, rather than the usual 3 to 6 levels, which results in a constantly changing amount of power to the wheels, while the source remains constant at its most fuel efficient rpm (if the rotary/turbine arrangement is in use). It also replaces the electric motor controller, which is quite expensive. Contemplated gear boxes may be modified from existing gear boxes or may be custom designed and/or built for the vehicle as needed.

Figure 2:
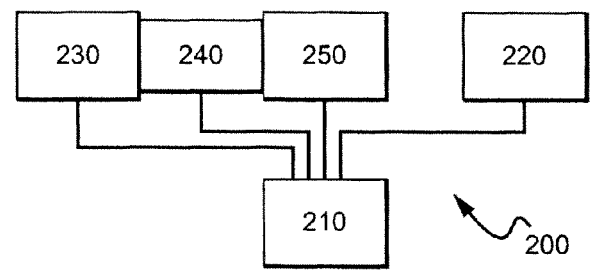
FIG. 2 shows another contemplated embodiment of a motor system 200, where the primary motor controller 210 is regulating/controlling the motor component 220 and the at least one binary controller (not shown), along with a rotary turbine 230, heat recovery unit 240 and generator 250.

FIG. 2 shows another contemplated embodiment of a motor system 200, where the primary motor controller 210 is regulating/controlling the motor component 220 and the at least one binary controller (not shown), along with a rotary turbine 230, heat recovery unit 240 and generator 250. The generator 250 and motor component 220 are matched at 20 kW and 100 kW power output levels. If a battery pack is provided in another embodiment, the battery power is generally only used as backup for the vehicle and not as primary power, as is seen in conventional hybrids, such as the Prius™ by Toyota.

Contemplated vehicles further comprise a regenerative braking system. The regenerative braking system connects to the brakes on the front wheels and works to charge the backup battery/battery pack. It should be understood from this disclosure, however, that this novel electric system is dramatically different from conventional electric systems, in that the system does not require battery power to function. If battery power is needed to provide the vehicle with additional power, the battery will be utilized in a support function only and not as the primary power source.

There are several advantages of the vehicle described above. First, the vehicle is more efficient compared to a conventional hybrid electric vehicle because the system eliminates the need for a controller, a capacitor bank and a large battery pack. Second, as compared to a conventional hybrid electric vehicle, the weight and cost of production is reduced for the vehicle because there is no need to install a complete internal combustion engine system—components like the transmission for the internal combustion engine are no longer necessary. As compared to a battery-powered electric-only vehicle, the range of the vehicle is not limited to its battery capacity. Since the range of the vehicle is not limited by the capacity of the battery pack, the size and weight of the battery pack can be made smaller than the battery pack of a conventional electric-only vehicle.

One additional advantage to utilizing the electric vehicles disclosed herein is that the system can plug into a house or another facility and provide power to the house, as opposed to being a "one-way consumer". In other words, conventional electric vehicles are plugged into a house and take power from the conventional, and some would argue dirty, power grid to charge a huge battery bank. Electric vehicles disclosed herein are considered "two-way consumers" in that they can take or provide power to a home or facility. In some areas of the world, such as Australia, this powering of the home from the vehicle can be done more economically than using the grid to power the home. Also, construction workers could power the projects they are building from their own trucks. In other embodiments, these new electric vehicles would be especially beneficial during natural disasters and weather events, where traditional power sources have been cut off or damaged. A homeowner or business can utilize vehicles as a power generator.

EXAMPLE 1

Binary Scaled Switch Reluctance Motor (BSSRM)

Depending on the vehicle load factor, a binary controller pre-selects a power range by activating the respective stator modules that result in this power output range. Within this range, the output resolution is determined by the resolution of the primary motor controller that controls the speed of the vehicle in respect to throttle input. In a contemplated embodiment, the binary controller selects the correct motor rating to ensure that the duty cycle is never below 50%, thus maximizing efficiency. A contemplated 2 bit binary motor represents, in effect, three different size motors. In a contemplated 3 bit binary motor—seven different size motors are represented in one housing with one rotor.

A contemplated switch reluctance (SR) motor has no rush in current at start up as opposed to any AC motor that relies on building up a inductive field in the rotor. Rush in current can be problem since it creates momentary current draws by an order of magnitude of several times of the operating current.

A contemplated SR motor design holds a lot of promise for increased future use in electric vehicles. The design has a number of inherent advantages which can be summarized as follows:

Lowest construction complexity of any motor (stamped components)

Inexpensive and easy to manufacture

Efficiencies greater than 90% possible

High torque to inertia ratio with no inrush current

High reliability (no brush wear)

No heating up of rotor due to efficiency losses. Only stator temperature increases.

Independent windings provide fault tolerant robust structure

High start up torque

Flat efficiency curve

High operating temperatures possible due to absence of permanent magnets

High speed operation possible without reduction in efficiency

Reversible

Can be used as generator

One major disadvantage of the SR motor is high torque ripple causing vibration and noise during operation. However, this can be overcome with employing a greater number of poles and with sophisticated high speed switching controllers. To date, SR motors are mainly used in constant high speed and constant load applications such as Vacuum cleaners, hand held power tools, air compressors etc.

Contemplated embodiments work to make the SR motor suitable for use in automotive propulsion systems for electric vehicles. In electric vehicles, the bas requirements for the motor are substantially different from those found in fixed speed industrial applications. Generally they are: a) need to maintain high motor efficiency over entire speed and load range, b) adequate torque to enable brisk acceleration with direct drive, c) with current technology, both of those requirements are difficult to fulfill at the same time. In order to maintain the motor efficiency above 90% at all times, the motor needs to maintain an average duty cycle of at least 40%. For this, the motor must be kept relatively small. A small motor however, does not have enough peak torque to ensure good acceleration and adequate top speed.

Figure 3:
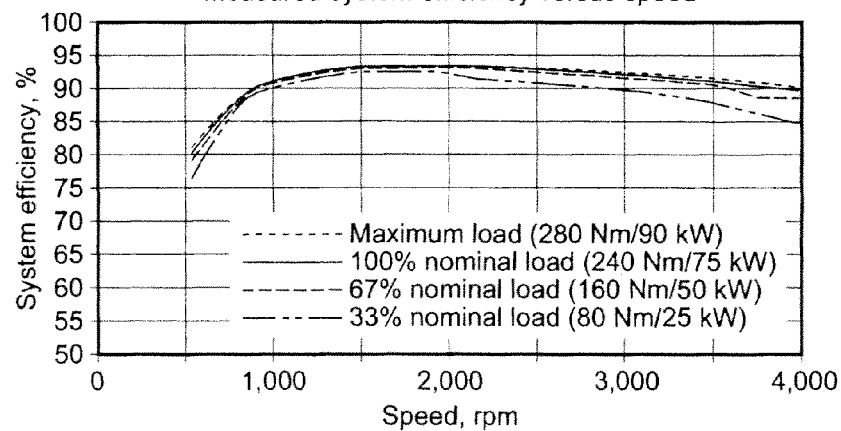
FIG. 3 shows that average efficiency decreases with a reduction in engine load.

FIG. 3 shows that average efficiency decreases with a reduction in engine load. The "BSSRM" technology has been specifically developed to ensure that performance does not have to come at the cost of maximum economy. The binary scaled motor has a single rotor with at least 2 separate stator segments where each successive segment has twice the output rating of the previous one. For a small to medium size vehicle, a 2 module motor with a rating of 20 and 40 Kw would be adequate.

In a 2 segment binary scaled motor, 3 different base power levels are given: 20, 40 and 60 Kw. The stator segments are seamlessly switched on and off through the Binary Splitter Module according to the given power demand, which is shown in Table 2. This method ensures that no individual motor segment has a nominal load of at least 50% of maximum at any given time. A 3 segment binary scaled motor enables 7 power levels at steps equivalent to the smallest stator segment as shown earlier in Table 1.

TABLE 2

| kW | 20 kW Segment | 40 kW Segment |
|---|---|---|
| 0 to 20 | 1 | 0 |
| 20 to 40 | 0 | 1 |
| 40 to 60 | 1 | 1 |

A vehicle fitted with such a motor would have high performance characteristics due to a 105 Kw high torque motor. In cruise mode, which only requires an average power draw of 20 to 25 Kw, the motor would still operate at well over 90% efficiency due to an average load factor of over 70%. A single stage 105 Kw motor however would only have a load factor of just over 20% under the same conditions thereby resulting in a significantly less energy efficient operation.

It should also be appreciated that various modifications, adaptations, and alternative embodiments thereof may be made within the scope and spirit of the present disclosure. For example, contemplated vehicles could be front-wheel driven, four-wheel driven, driven by any other combination of the wheels, or be driven by multiple electric motors.

Thus, specific embodiments and applications of high performance and improved efficiency electric vehicles and methods of production have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A motor system, comprising:
   at least one motor component,
   at least one motor stator module,
   at least one binary controller, wherein the binary controller is coupled to the at least one module,
   at least one generator, and
   a modified gear box.

2. The motor system of claim 1, wherein the motor system comprises an electric motor.

3. The motor system of claim 1, wherein the motor component comprises a rotor.

4. The motor system of claim 1, wherein the at least one motor stator module comprises at least two load bearing module components.

5. The motor system of claim 4, wherein each of the at least two load bearing module components comprise a different load value.

6. The motor system of claim 4, wherein each of the at least two load bearing module components comprise a same load value.

7. The motor system of claim 1, wherein the at least one binary controller comprises at least one programmable chip component.

8. The motor system of claim 7, wherein the at least one programmable chip component comprises a binary coding system.

9. The motor system of claim 8, wherein the binary coding system comprises a multi-bit binary code.

10. The motor system of claim 8, wherein the binary coding system generates at least one pre-selected power output level, a power range or a combination thereof.

11. The motor system of claim 10, wherein the at least one pre-selected power output level comprises a three step resolution.

12. The motor system of claim 10, wherein the at least one pre-selected power output level comprises a seven step resolution.

13. The motor system of claim 1, wherein the at least one binary controller comprises at least one discreet driver module.

14. The motor system of claim 1, further comprising at least one primary motor controller, wherein the primary motor controller is coupled to a vehicle speed component.

15. The motor system of claim 1, further comprising at least one electrical current generation module, at least one secondary or supplemental battery power pack, at least one additional motor or a combination thereof.

16. The motor system of claim 1, wherein the at least one generator comprises a turbine, such as Tesla turbines, a rotary device, a tuned single rpm version of a rotary device, a Peripeteia generators or a combination thereof.

17. A motorized vehicle comprising the motor system of claim 1.

18. The motorized vehicle of claim 17, wherein the vehicle comprises a car, a boat, a motorcycle, a jet ski or a truck.

19. The motor system of claim 1, wherein the at least one motor component comprises a binary scaled switch reluctance motor.

* * * * *